(12) United States Patent
Rosenfeldt et al.

(10) Patent No.: US 8,921,744 B2
(45) Date of Patent: Dec. 30, 2014

(54) LINE CONNECTOR FOR MEDIA LINES

(75) Inventors: Sascha Rosenfeldt, Dortmund (DE); Martin Vedder, Kierspe (DE)

(73) Assignee: VOSS Automotive GmbH, Wipperfürth (DE)

( * ) Notice: Subject to any disclaimer, the term of this patent is extended or adjusted under 35 U.S.C. 154(b) by 799 days.

(21) Appl. No.: 13/129,615

(22) PCT Filed: Nov. 12, 2009

(86) PCT No.: PCT/EP2009/065027
§ 371 (c)(1),
(2), (4) Date: May 17, 2011

(87) PCT Pub. No.: WO2010/057819
PCT Pub. Date: May 27, 2010

(65) Prior Publication Data
US 2011/0248494 A1  Oct. 13, 2011

(30) Foreign Application Priority Data

Nov. 18, 2008 (DE) .................. 20 2008 015 289 U
Sep. 18, 2009 (DE) .................. 10 2009 042 210

(51) Int. Cl.
| | |
|---|---|
| *H05B 3/58* | (2006.01) |
| *F16L 53/00* | (2006.01) |
| *B29C 65/16* | (2006.01) |
| *B29C 65/00* | (2006.01) |
| *F16L 55/00* | (2006.01) |

(52) U.S. Cl.
CPC ............... *F16L 53/008* (2013.01); *B29C 65/16* (2013.01); *B29C 66/1122* (2013.01); *B29C 66/97* (2013.01); *B29C 66/5324* (2013.01); *B29C 65/1635* (2013.01); *B29C 66/5229* (2013.01); *B29C 66/54* (2013.01); *B29C 66/549* (2013.01)
USPC ............................................ 219/535; 285/41

(58) Field of Classification Search
CPC  B29C 65/16; B29C 66/1122; B29C 66/5221; B29C 66/97; B29C 66/5229; F16L 53/008
See application file for complete search history.

(56) References Cited

U.S. PATENT DOCUMENTS

| 4,329,569 A | 5/1982 | Hjortsberg et al. |
| 7,387,114 B2 | 6/2008 | Gschwind et al. |
| 2008/0202108 A1 | 8/2008 | Stritzinger et al. |

FOREIGN PATENT DOCUMENTS

| DE | 35 44 589 C2 | 1/1994 |
| DE | 101 30 362 | 1/2003 |
| DE | 20 2004 016 102 U1 | 12/2004 |
| DE | 20 2007 009 588 | 9/2008 |
| EP | 0 219 126 | 4/1987 |
| EP | 1 557 601 B1 | 6/2006 |
| EP | 1 985 908 | 10/2008 |
| FR | 2 605 273 | 4/1988 |
| JP | 9-42573 | 2/1997 |

(Continued)

*Primary Examiner* — Shawntina Fuqua
(74) *Attorney, Agent, or Firm* — Brinks Gilson & Lione

(57) ABSTRACT

A line connector for media lines having a connecting piece with a flow channel, at least one connecting section for connection to a media line or unit, and at least one transition section adjacent to the connecting section. In order to prevent freezing of the respective medium at low temperatures in the connecting area or to thaw a frozen medium, the line connector includes heating means arranged to at least partially enclose the flow channel. A fixing part, with elements for guiding and fixing the heating means, is provided on the connecting piece.

23 Claims, 17 Drawing Sheets

(56) References Cited

FOREIGN PATENT DOCUMENTS

| JP | 10-204943 | 8/1998 |
| JP | 2002-71067 | 3/2002 |
| JP | 2004-114456 | 4/2004 |
| JP | 2005-305985 | 11/2005 |
| WO | 2008/151924 | * 5/2008 |
| WO | WO 2008/151924 | 12/2008 |
| WO | WO 2009/013342 | 1/2009 |
| WO | WO 2009/080477 | 7/2009 |

* cited by examiner

Fig.1
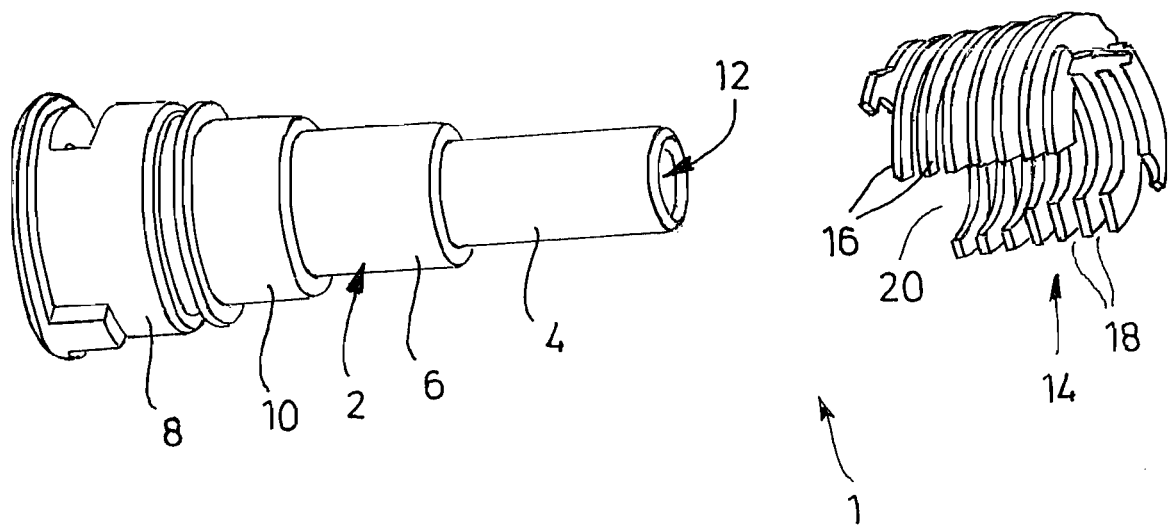
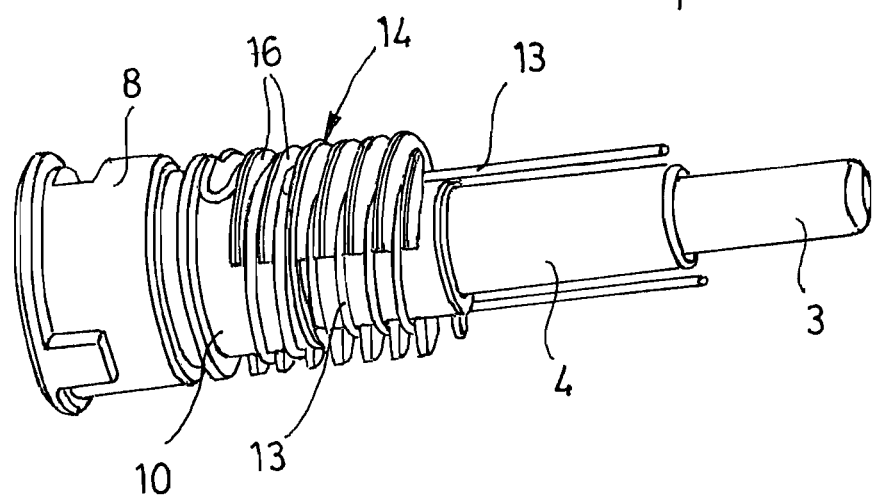
Fig.2

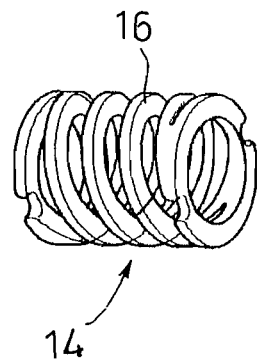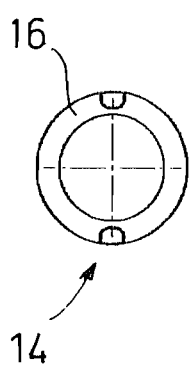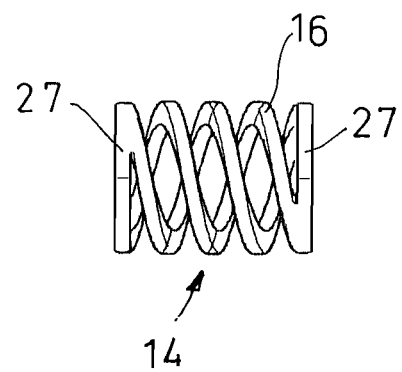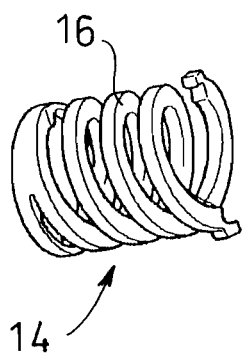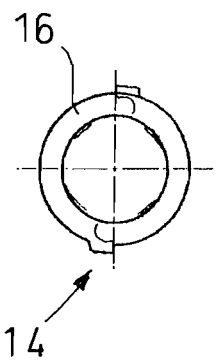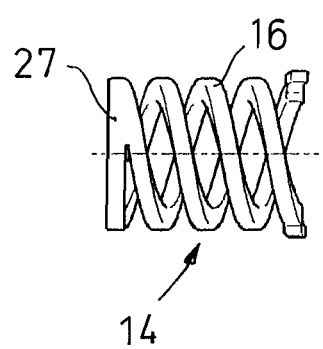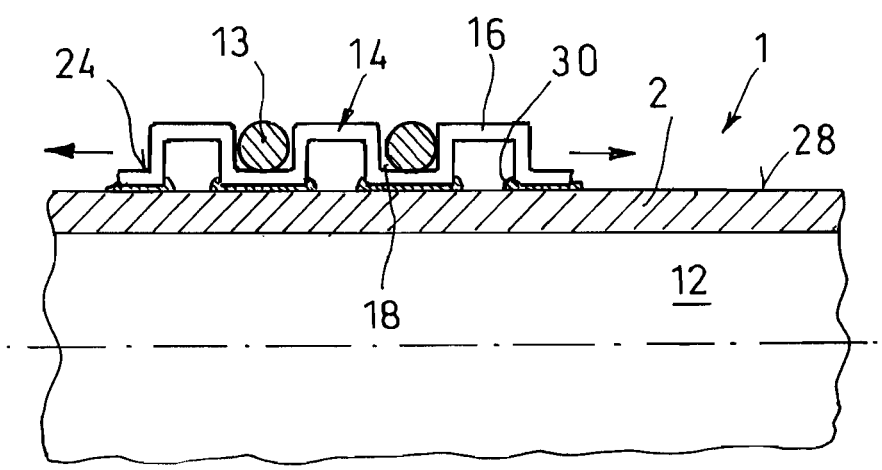

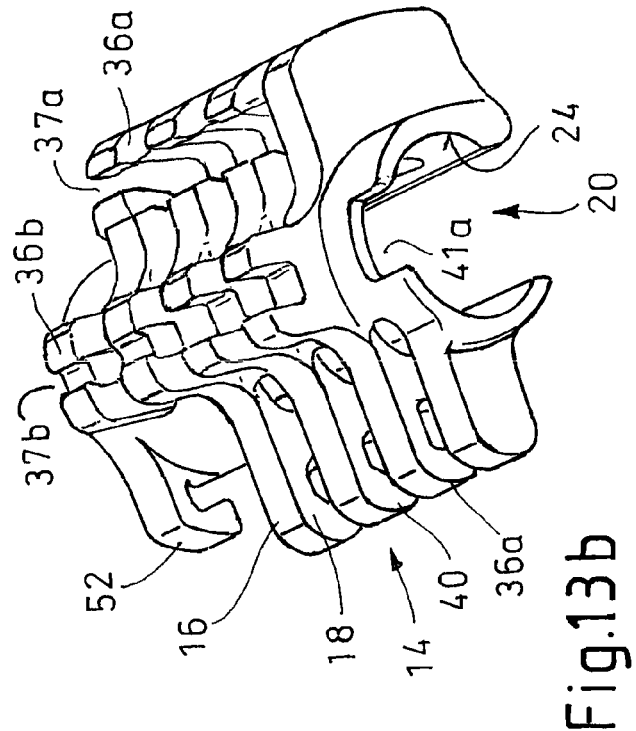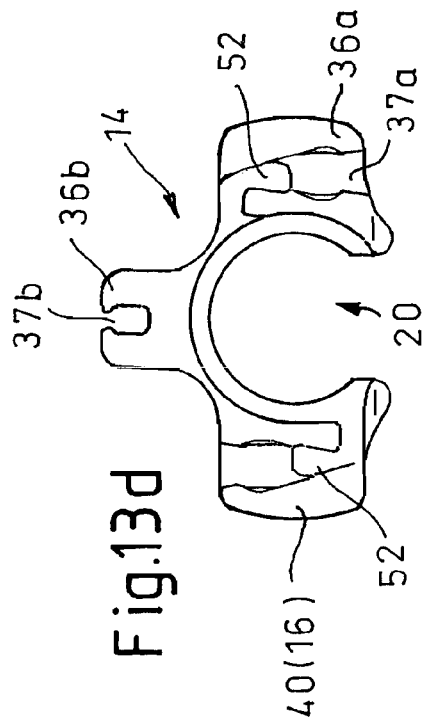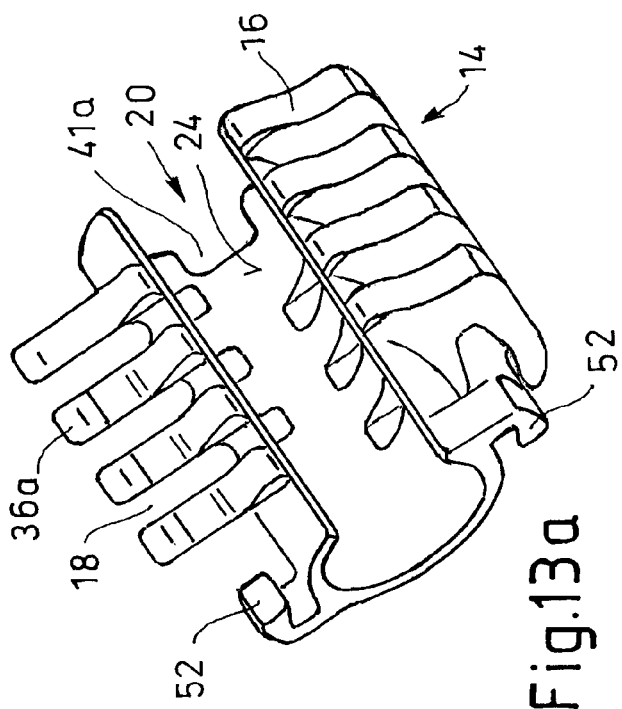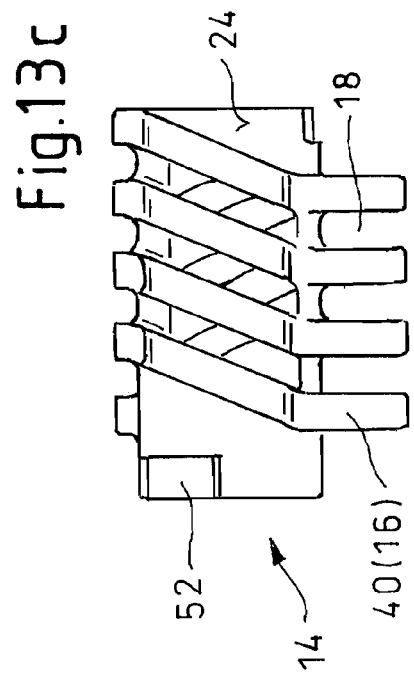

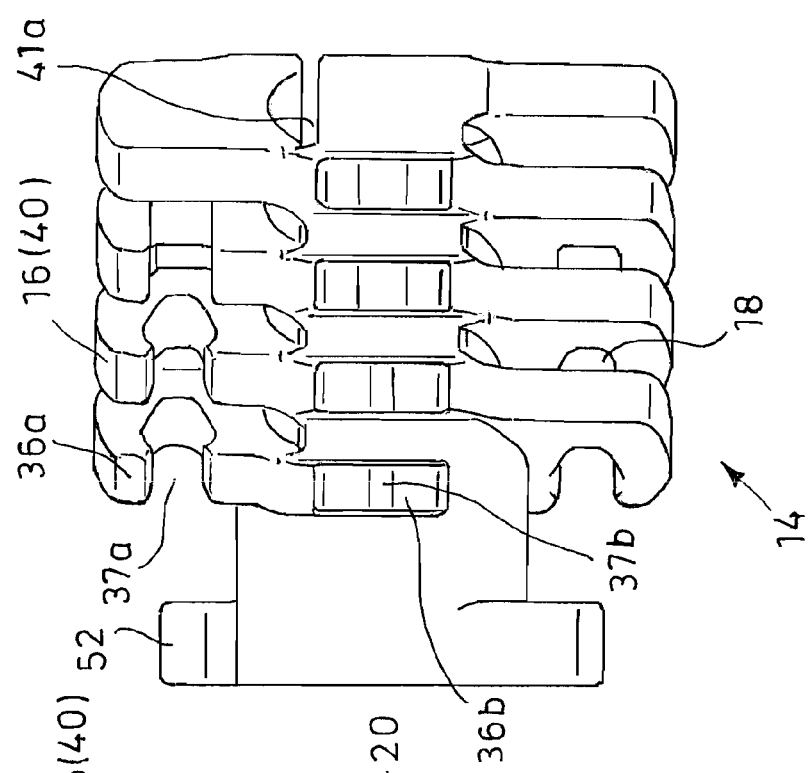
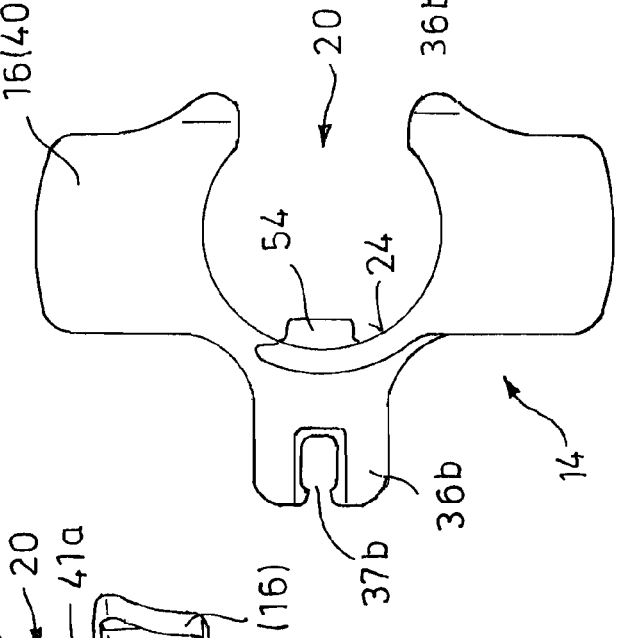
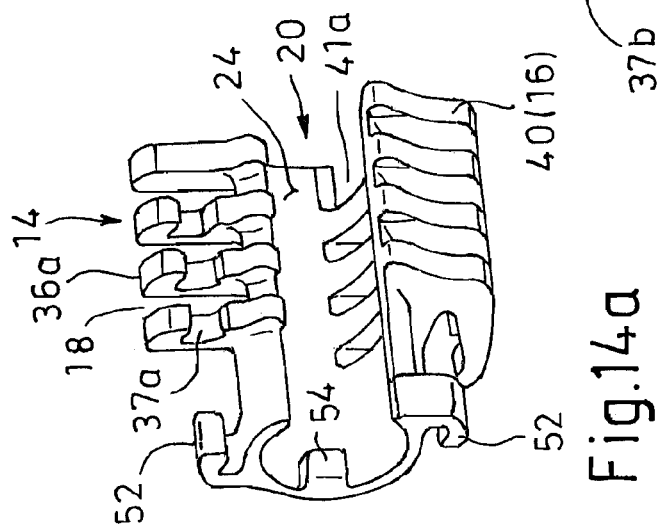

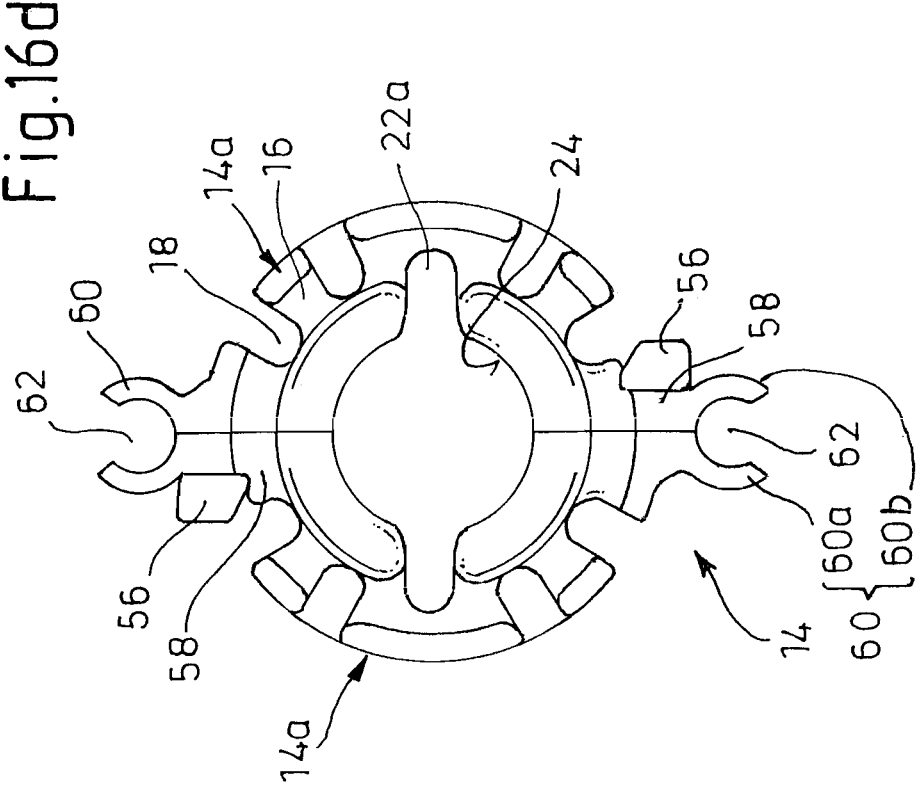
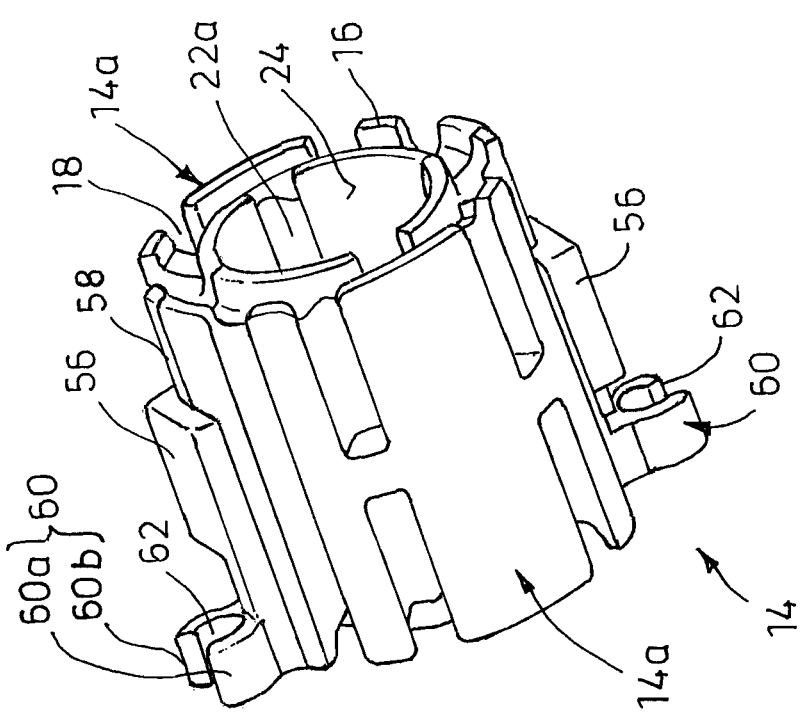

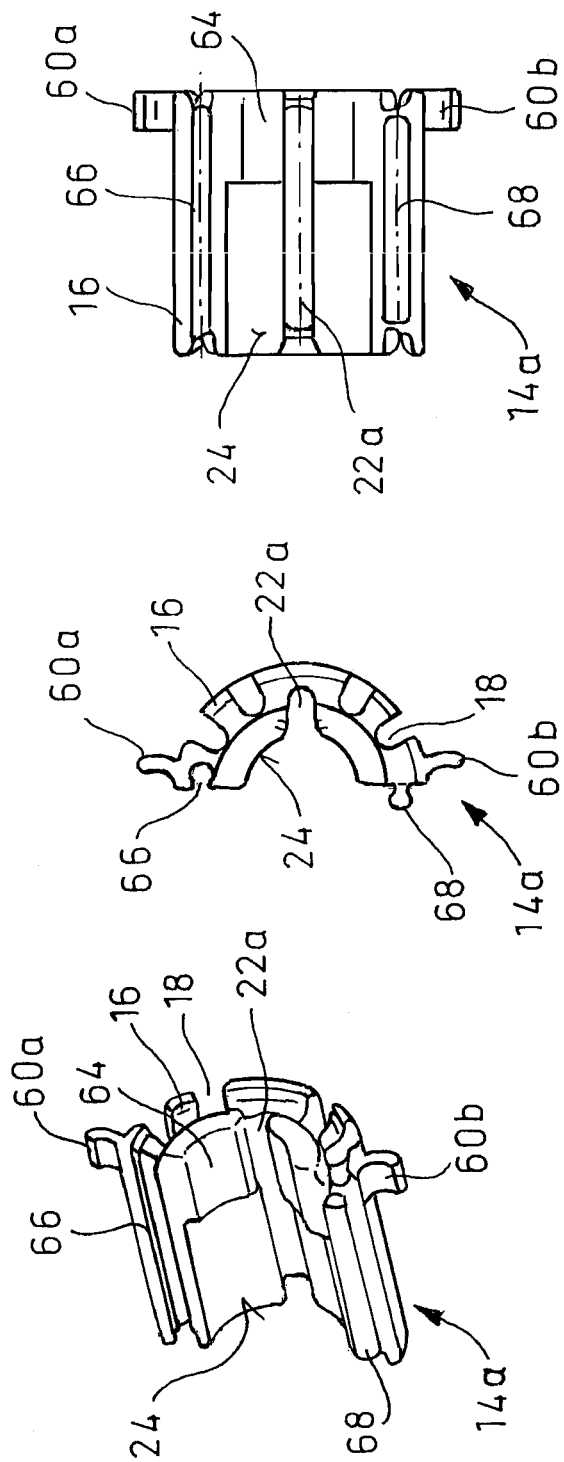

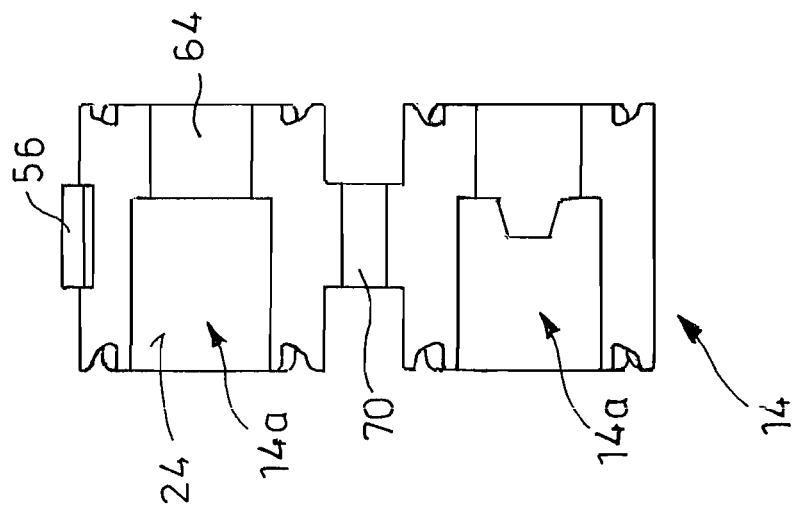
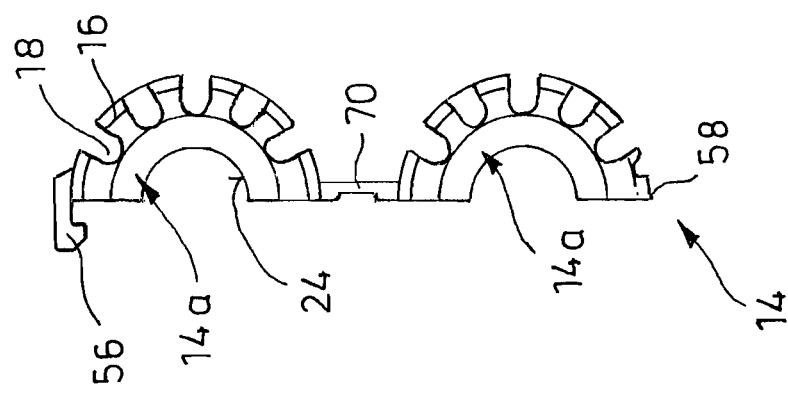
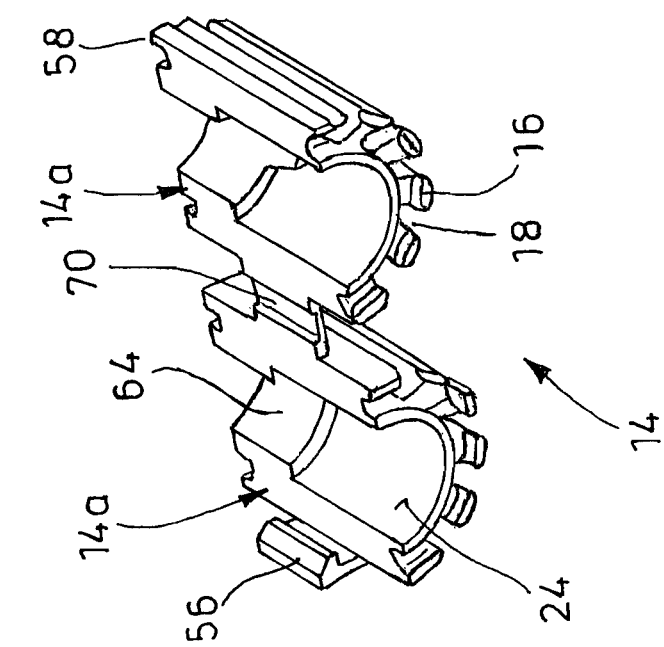

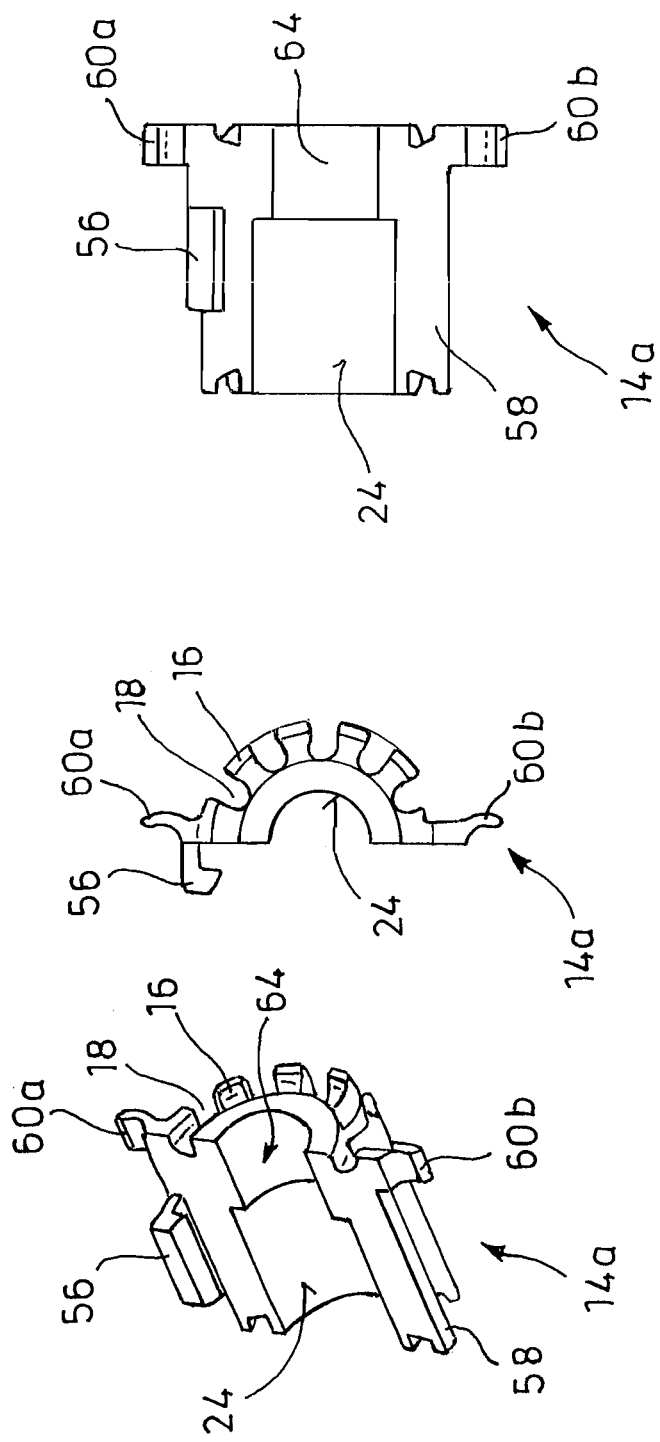

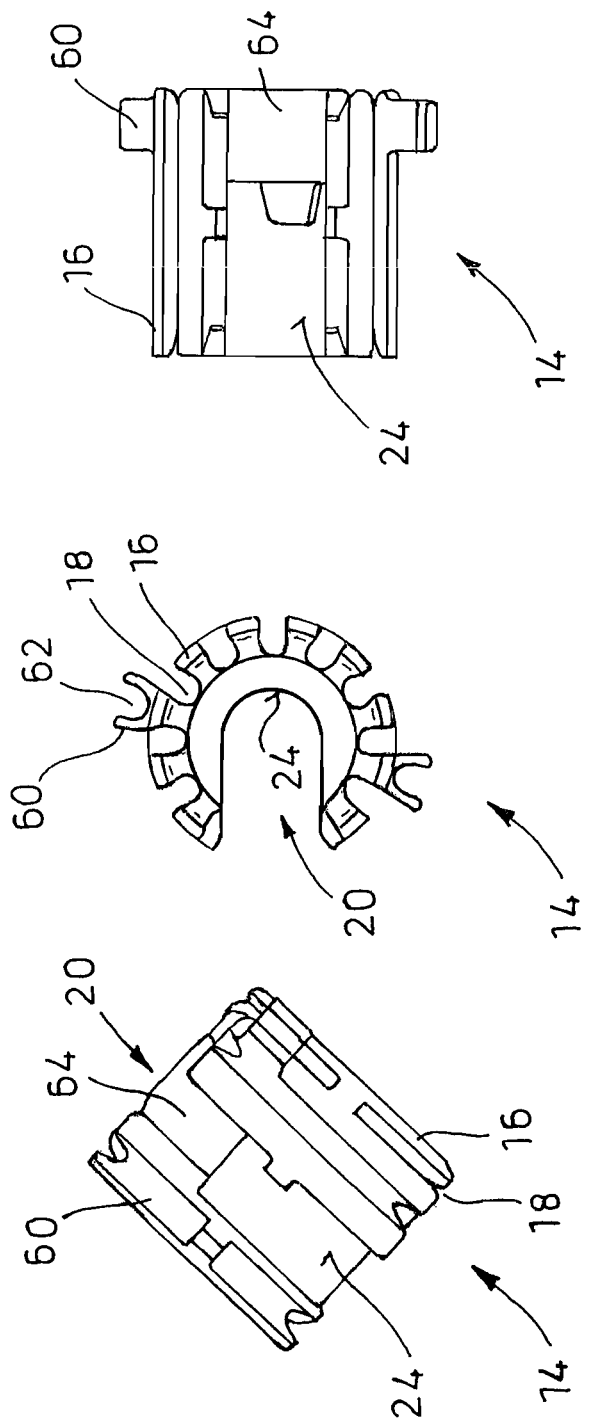

LINE CONNECTOR FOR MEDIA LINES

BACKGROUND

1. Field of the Invention

The invention concerns a line connector for media line. The line connector includes a connecting piece having a flow channel and at least one connecting section, for connection to the media line or to a unit, and at least one transition section adjacent to the connecting section.

2. Related Technology

Line connectors of the kind to which the present invention relates serve for mutual connection of at least two media lines or for connection of at least one line to an optional unit, especially in a motor vehicle. Such media are frequently fed via lines that tend to freeze even at high ambient temperatures, which are quite possible depending on the weather, as a result of their relatively high freezing point. Specific functions can be affected by this. This is the case, for example, with the water lines of the windshield wiping system, as well as also with lines for release of urea, which is used as an additive for $NO_x$ reduction in diesel engines with so-called SCR catalysts. The freezing point of an SCR medium is about −11° C.

The media line can be, in particular, a pipe or tube line for pneumatic or hydraulic media, which is to be connected to any desired receiving part, such as, for example, a part of a unit or another line connecting part, whose connection opening is preferably configured as cylindrical or conical. Such media lines are frequently made of plastic and are connected to each other or to a shaft-shaped connecting section of the line connector, for example, welded by means of a laser, flared, or connected to each other in another way.

SUMMARY OF INVENTION

It is an object of the invention to create a line connector of the kind described above, which is especially suited for the mentioned preferred application and which prevents a freezing of the respective medium in the connection area or makes possible a thawing—in particular based on a starting temperature of up to −30° C.—within a predetermined period of time.

According to the invention a heating means is provided in an arrangement that partially encloses the flow channel, wherein a fixing part with elements for guiding and/or fixing the heating means is arranged on the connecting piece.

Heating means, in particular electric heating means, are provided according to the invention in an arrangement that encloses the flow channel over at least part of its circumference, but preferably over all 360° thereof. These heating means can prevent or nullify a freezing of the respective medium inside the connecting piece by thawing a medium that has frozen, for example, overnight, in a parked vehicle. The heating means are conceived in such a way that a defined heating with good electric isolation, good heat transfer, good mechanical properties, and protection from mechanical damage and corrosion are ensured therein.

Because a fixing part with elements for guiding and fixing the heating means can be arranged on the connecting piece according to the invention, it is possible, if necessary, to heat a line connector, which is unheated or which until now could not be heated, by equipping it with the additional part, which is easy to assemble. One kind of connecting piece is thus only necessary for the unheatable and heatable line connector, which leads to a reduction of the tool costs.

It is possible herein to configure the fixing part in such a way, for example, as a spiral, that it can be slid onto, or clipped to the connecting piece in a preferred embodiment, in order to produce a releasable connection between the connecting piece and the fixing part.

A sliding of the fixing part onto the transition section and/or in particular onto a connecting section to which a media line is to be connected or, in particular, a pipe piece is to be welded, can take place therein before the pipe piece is welded shut.

A fixing part, which also covers the welded area, can be provided as a variation in one particularly preferred embodiment of the invention. In this way, there is not one area in which the medium could not or could not be sufficiently thawed. It is thus advantageously possible to carry out a continuous, uninterrupted heating of a line assembled with the pipe connector according to the invention over the entire length, so that a protection against freezing is ensured over the entire transport path of the medium.

Further advantageous features of the embodiments of the invention are disclosed in the dependent claims as well as also in the following description.

BRIEF DESCRIPTION OF THE DRAWINGS

The invention will be described in more detail in the following on the basis of several preferred exemplary embodiments, wherein:

FIG. 1 shows a perspective exploded view of a line connector according to a first embodiment of the invention, wherein a connecting piece and a fixing piece are depicted;

FIG. 2 shows the individual parts depicted in FIG. 1 in assembled state;

FIGS. 6a, 6b and 6c show a perspective view, front view and front elevation view, of a fifth embodiment of a fixing part of a line connector according to the invention;

FIGS. 7a, 7b and 7c show a perspective view, front view and front elevation view, of a sixth embodiment of a fixing part of a line connector according to the invention;

FIG. 8 shows a longitudinal section through a seventh embodiment of a line connector according to the invention;

FIGS. 13a through 13d show four different views of a fixing part of an eleventh embodiment of a line connector according to the invention assembled with a connecting piece and heating wires;

FIGS. 14a, 14b and 14c show a perspective view, front view and front elevation view, of a twelfth embodiment of a fixing part of a line connector according to the invention;

FIG. 16a through 16d show four different views of a fixing part of a fourteenth embodiment of a line connector according to the invention;

FIGS. 17a, 17b and 17c show a perspective view, front view and front elevation view, of a fifteenth embodiment of a fixing part of a line connector according to the invention;

FIGS. 18a, 18b and 18c show a perspective view, front view and front elevation view, of a sixteenth embodiment of a fixing part of a line connector according to the invention;

FIGS. 19a, 19b and 19c show a perspective view, front view and front elevation view, of a seventeenth embodiment of a fixing part of a line connector according to the invention; and FIGS. 20a, 20b and 20c show a perspective view, front view and front elevation view, of an eighteenth embodiment of a fixing part of a line connector according to the invention.

DETAILED DESCRIPTION

Figure 3A:
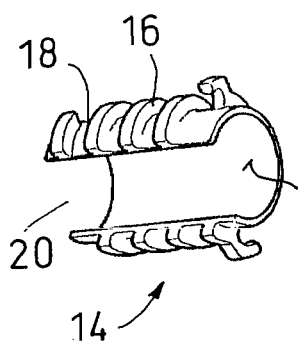
FIGS. 3a, 3b and 3c show a perspective view, front view and front elevation view, of a second embodiment of a fixing part of a line connector according to the invention.

Throughout the description, like parts are provided with the same reference numerals in the different embodiments shown in the figures of the drawings. Each description of a part that refers to a figure or part of a figure of the drawings, and which is mentioned only once, applies therefore also to the other figures and embodiments of the drawings in which this part, provided with this reference numeral, can likewise be seen.

As shown initially in FIGS. 1 and 2, a line connector 1 for media lines according to the invention, which is a sleeve part in the shown embodiment, consists of a connecting piece 2, having at least one connecting section 4, 8—in the depicted case two connecting sections 4, 8—and at least one transition section 10 adjacent to the connecting section 4, 8—in the depicted case two transition sections 6, 10—with a continuous flow channel 12 for the medium. Under the term "transition section" 10 is understood therein an area of the line connector 1 or the connecting piece 2, which is still "exposed" after connection of the lines 3 (seen in FIG. 2) and/or on a unit.

In the illustrated case, two transition sections 6, 10 with different diameters are provided, which are obtained by designing the connecting section 8 of the line connector 1 to accommodate an especially standardized plug part (which is not shown) on its side depicted on the left side of the drawing, for which reason peripheral seals are arranged in the interior of the transition section identified with reference numeral 10 having the largest outer diameter, which also corresponds to a larger inner diameter.

The corresponding connecting section 4, 8 can also be configured as a connecting pin for directly attaching a media line 3 or plug shaft that can be inserted into a plug sleeve. In the embodiments of the invention represented in FIGS. 1, 2, 9 and 11, the connecting section 4, which is provided especially with a hollow cylindrical shape, forms a receiver for direct insertion of the media line 3. The media line 3 is therein preferably firmly bonded in the connecting part 4, for example, glued or welded. The connecting section 4 is thus especially a welded section. The connecting section 4 can be made at least in some areas from a material transparent to a laser in order to achieve welding by means of a laser beam.

Electric heating means 13, which are only depicted in FIGS. 2, 8, 12e and 12f, 13e and 13f as well as 16e and 16f, are provided in an arrangement that at least partially encloses the flow channel 12. As heating means 13, for example, at least one heating wire can be provided which is guided with a somewhat even surface distribution over an area of the connecting piece 2. The heating means 13 can be arranged in the connecting sections 4, 8 and/or—as shown—in the adjacent transition sections 6, 10.

The line connector 1 according to the invention is suitable in this way particularly for lines in motor vehicles for feeding media in danger of freezing, such as water or in particular aqueous urea solutions.

A fixing part 14 with elements 16, 18 is arranged on the connecting piece 2 to guide and/or fix the heating means 13 in place. As elements 16, 18, outwardly projecting attachment pieces 16 can be provided, or ribs and/or—for example, groove-shaped—recesses 18. The fixing part 14 can preferably be a molded plastic part, for example, an injection molded part produced in a two-component process, or it is also possible to mold the fixing part 14 as one piece on the connecting piece 2.

It is also possible to integrate specific additional functional sections in the fixing part 14 or in the structural unit consisting of the fixing part 14 and the connecting piece 2. Such a functional section can preferably be a conically tapering sealing section arranged in the area of the connecting section 4 and/or the pipeline 3, which extends in direction toward the pipeline 3, on which a corrugated pipe that encloses the media line 3, for example, can be attached.

The heating wire 13 can have, for example, a meander-shaped or serpentine-shaped course in order to prevent a coiling effect when there is flowing current, and depending upon the embodiment and arrangement of the elements 16, 18. The heating wire 13 can also enclose the connecting piece 2 by wrapping itself around its outer side in the manner of a coil, wherein it runs within the groove-like recesses 18, for example, in the manner of a helical line, as shown in FIG. 8.

As is especially shown, for example, in the representation of FIG. 2, the fixing part 14 according to the first embodiment of the invention is configured in such a way that a heating wire 13 subsequently mounted on the fixing part can heat both transition sections 6, 10.

A heating wire 13 such as this, which is mounted on the fixing part 14, can be covered therein with an isolating layer, which consists, for example, of a powder lacquer or the like. It can also be a dip coating. The heating wire 13 itself can be configured without isolation as a result of the isolating coating.

As can also be seen in FIGS. 1 and 2, the fixing part 14 can be configured basically in ring or pipe shape. The elements 16, 18 of the fixing part 14 for guiding and fixing the heating means 13 can run therein preferably in helical shape or also axially parallel to the flow channel 12 over the outer circumference of the fixing part 14.

In the first embodiment of the invention, the fixing part 14 is provided with a slot 20, in particular a longitudinal slot. The fixing part 14 has thus a configuration in C shape, which likewise at least partially encloses the connecting piece 2 or the flow channel 12, and can preferably correspond to the shape of the electric heating means 13. The heating means 13 can indeed also be guided past the slot 20 in the assembled state. The fixing part 14 can be advantageously clipped onto the connecting piece 2 in this configuration, for example, before or after the media line 3 is welded to the corresponding connecting section 4. The line connector 1 can be utilized without the fixing part 14 for unheated applications.

Figure 15C:
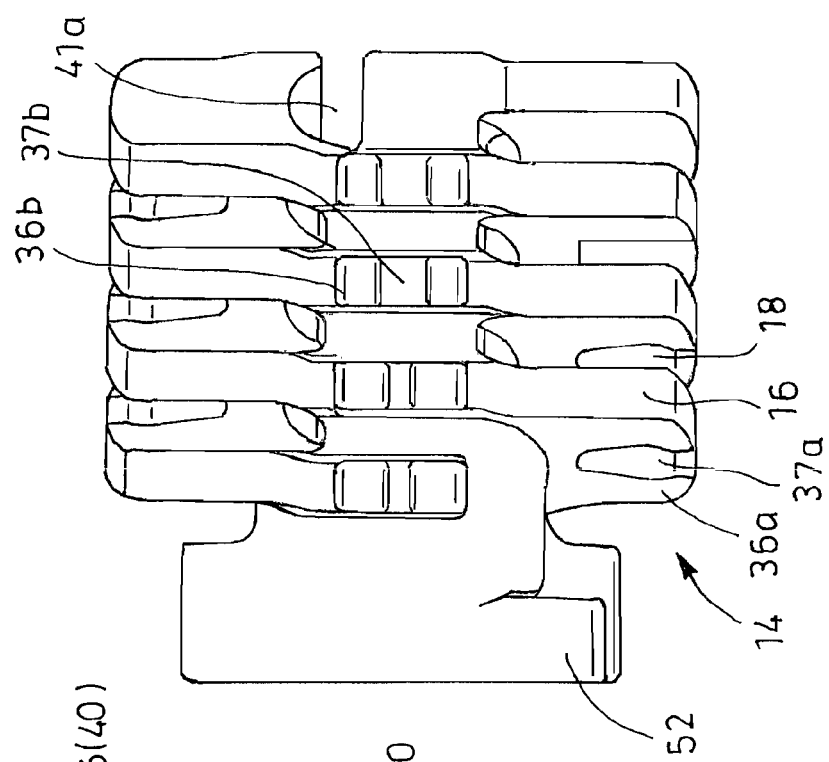
FIGS. 15a, 15b and 15c show a perspective view, front view and front elevation view, of a thirteenth embodiment of a fixing part of a line connector according to the invention.
Figure 15B:
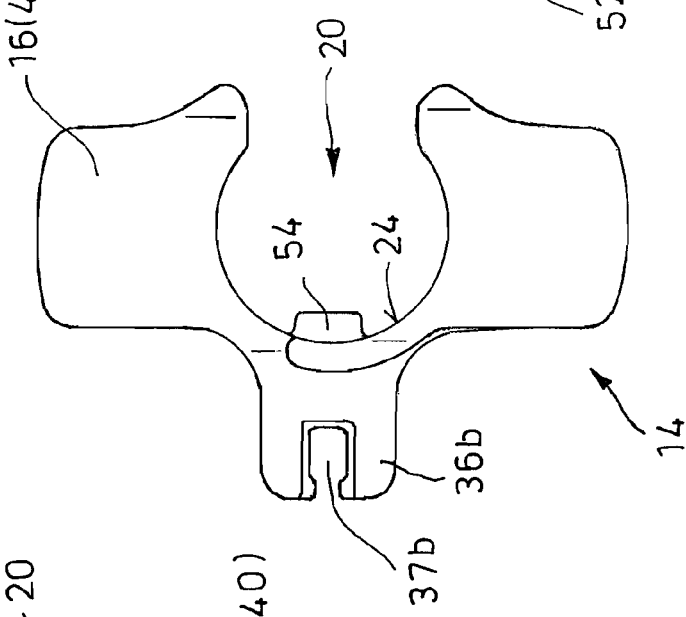
Figure 15A:
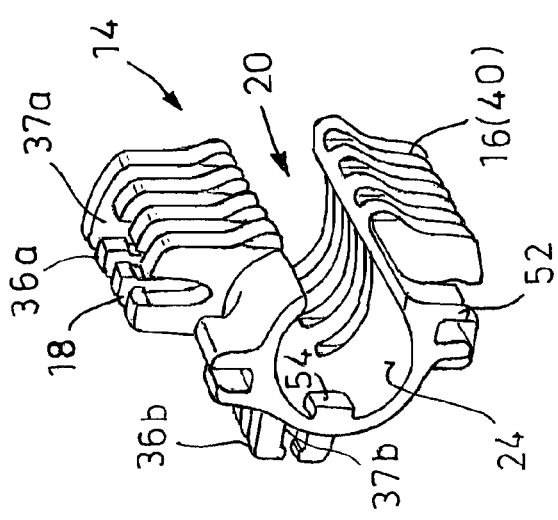

Configurations of the fixing part 14 that are similar to those of FIGS. 1 and 2 are also shown—in respectively different views—in FIGS. 3a, 3b, 3c through FIGS. 5a, 5b, 5c as well as 12a and following figures up to FIGS. 15a, 15b, 15c.

Figure 3B:
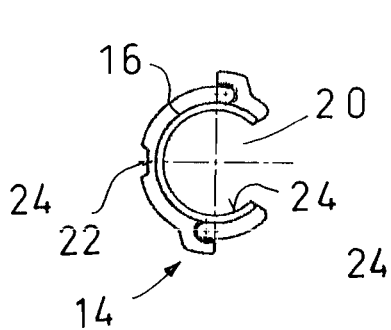
Figure 3C:
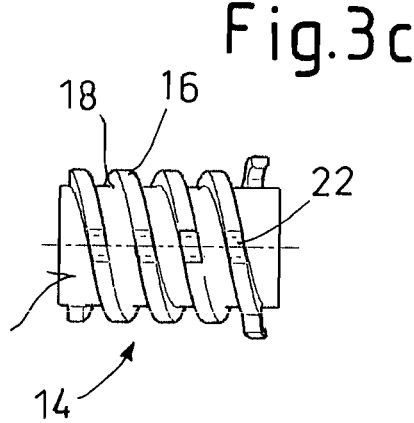

FIGS. 3a, 3b, 3c show in particular a configuration of the fixing part 14 as a thin-walled spring provided with a longitudinally running slot 20 for subsequent clipping, snapping, or locking onto the connecting piece 2. FIG. 3b shows in particular a cross section of the C-shaped configuration of the fixing part 14, wherein a weakened area 22 is configured on the outside of the full-surface wall 24 on the side diametrically opposite to the slot 20 in order to facilitate bending or opening for attachment to the connecting piece.

Figure 4A:
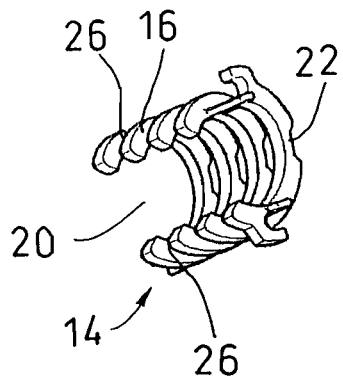
FIGS. 4a, 4b and 4c show a perspective view, front view and front elevation view, of a third embodiment of a fixing part of a line connector according to the invention.
Figure 4B:
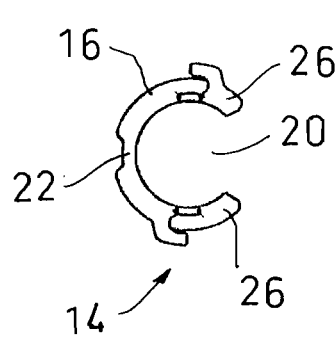
Figure 4C:
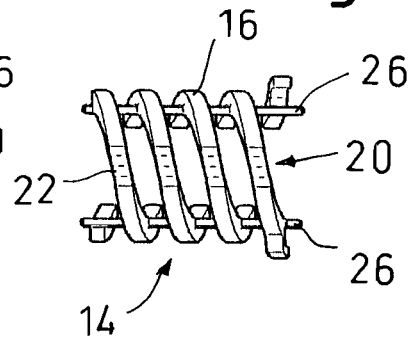

In the embodiment according to FIGS. 4a, 4b, 4c, the fixing means 14 is likewise configured as a slotted spring for subsequent clipping. The fixing part has two longitudinal ribs 26 therein, which can be seen particularly well in FIG. 4c, and not a closed wall, so that it has an overall cage-like configuration, wherein the rib-like elements 16 for guiding and fixing the heating means 13 are configured in the manner of a double helix. The open and/or closed slots of the helical clip make possible a direct heat transfer from the heating wire to the connecting piece 2.

Figure 5A:
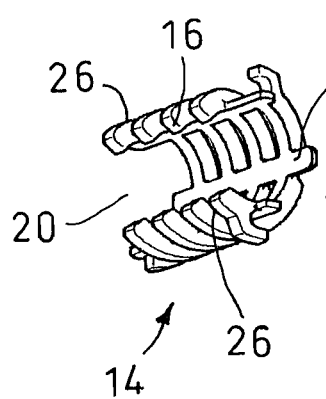
FIGS. 5a, 5b and 5c show a perspective view, front view and front elevation view, of a fourth embodiment of a fixing part of a line connector according to the invention.
Figure 5B:
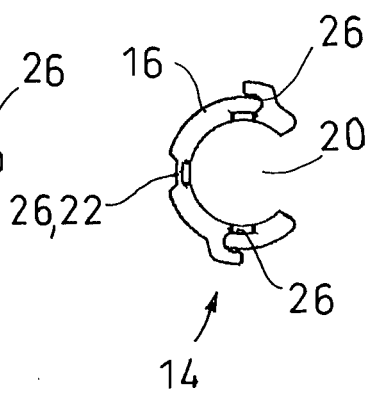
Figure 5C:
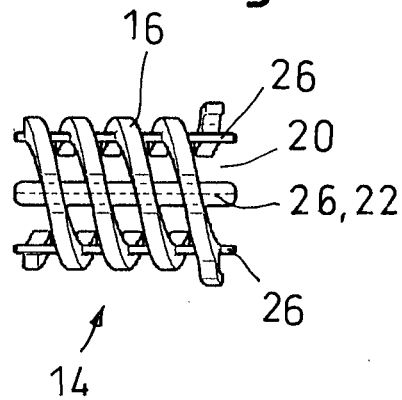

A similar configuration of the fixing part 14 is also shown in FIGS. 5a, 5b, 5c. Three longitudinal ribs 26 are however provided herein, wherein the central longitudinal rib 26 constitutes at the same time the aforementioned weakened area 22, as is shown in particular in FIG. 5b.

For the embodiments of the fixing part 14, which are depicted—again in respectively different views—in FIGS. 6a, 6b, 6c and FIGS. 7a, 7b, 7c, the invention provides that the fixing part 14 is slid onto the connecting piece 2, in particular before the media line 3 is welded to the line connector 1 according to the invention. The fixing part 14 can then be slid out of the welding area and subsequently slid back into it for the welding procedure. In these embodiments, a configuration is provided in the manner of an especially cage-like collar part for the connecting piece 2, wherein the fixing part 14 is delimited at both ends by means of two peripherally closed connecting beads 27, in which the elements terminate, in the configuration according to FIGS. 6a, 6b, 6c, while the fixing part 14 only has one peripherally closed end bead 27 at one end and free projecting ends for the elements 16 in the embodiment according to FIGS. 7a, 7b, 7c.

The fixing part 14 is configured as a spirally corrugated pipe in another embodiment of a line connector 1 shown in longitudinal cross-section in FIG. 8. The peaks of the corrugations defined as outwardly projecting attachment pieces 16 and the valleys of the corrugations of the wall 24 defined as groove-like and peripheral spirally running recesses 18 serve as elements 16, 18 of the fixing part 14 for the purpose of guiding and fixing the heating means 13. The spirally corrugated pipe can be configured for clipping on the connecting piece 2 or in collar-like or sleeve-like design for sliding onto the connecting piece 2, depending on if a slot 20 is or is not provided in the fixing part 14.

A heat conducting paste, which is known per se and is identified with reference numeral 30 in FIG. 8, can be introduced between the fixing part 14 and the connecting piece 2 in order to intensify the heat transfer between the wall 24 of the fixing part 14 and the wall 28 of the connecting piece 2.

Figure 10:
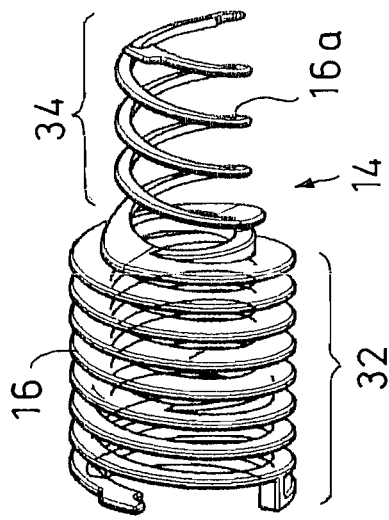
FIG. 10 shows a perspective detail drawing of the fixing part depicted in FIG. 9.
Figure 9:
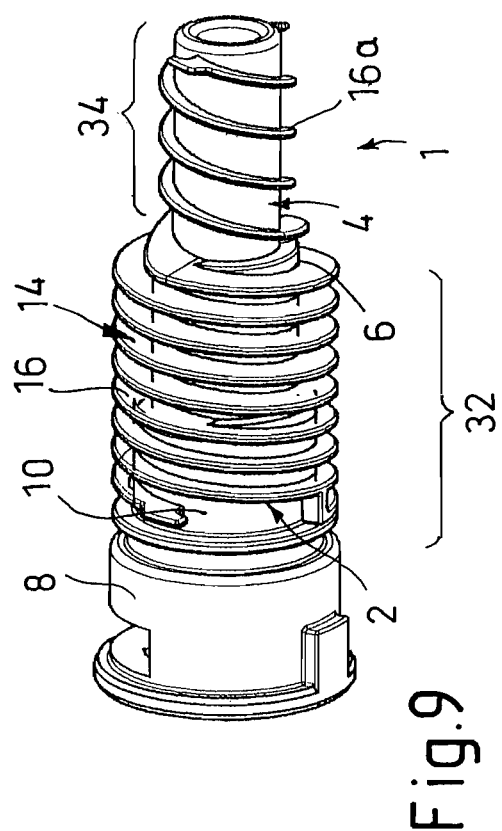
FIG. 9 shows an eighth embodiment of the line connector according to the invention in an assembled view similar to that of FIG. 2.
Figure 11:
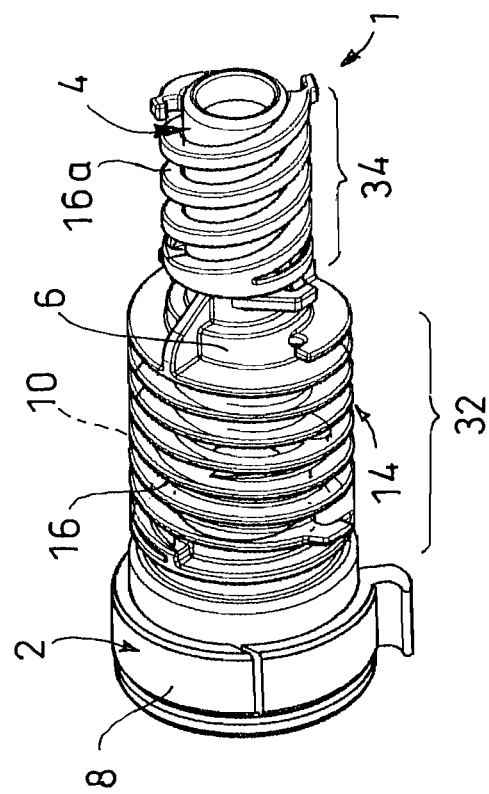
FIG. 11 shows a ninth embodiment of a line connector according to the invention in a view similar to that of FIGS. 2 and 9.

In the embodiment of the line connector 1 according to the invention to which FIGS. 9 and 10 refer, wherein the latter only shows the fixing part 14, as well as in the embodiment of the line connector 1 according to the invention to which FIG. 11 refers, the fixing part 14 is configured without the slot 20 and is slid for assembly onto the connecting piece 2 in the manner of a collar or sleeve. A particular characteristic with respect to the embodiments shown in FIGS. 6a, 6b, 6c and FIGS. 7a, 7b, 7c consists herein however in that the fixing part 14 in the assembled state not only covers the transition sections 6, 10, but also the connecting section 4. The rib-like elements 16 for guiding and fixing the heating means 13 run again in the manner of a double helix in the fixing means 14 and have free projecting ends.

A first fixing section 32 of the fixing part 14, which is adapted to the larger diameter of the transition sections 6, 10, proceeds seamlessly into a second fixing section 34 for the heating means 13, which is adapted to the smaller diameter of the connection section 4. In this way there is not a single area of the line connector 1 in which the medium cannot be heated. In the structural unit consisting of the pipe connector 1 according to the invention and the media line 3, it is advantageously possible to realize a continuous uninterrupted heating over the entire length in that the fixing part 14 for the heating means 13 can also be extended, if necessary, over and beyond the pipeline 3 or at least a part thereof.

The fixing part 14 can be compressed like a helical spring in the two fixing sections 32, 34 in the welding area for the welding procedure. While the spring effect of the fixing part 14 has predominantly a functional effect in radial direction in the manner of a resetting after a peripheral expansion in the embodiments according to FIGS. 3a, 3b, 3c to FIGS. 5a, 5b, 5c, it has a functional effect predominantly in axial direction according to FIGS. 9 to 11, or optionally also in the embodiments of FIGS. 6a, 6b, 6c and FIGS. 7a, 7b, 7c. After the welding procedure, the compressed fixing part 14 springs back and again completely covers the connecting section 4 and encloses the latter with the second fixing section 34.

The configuration of the line connector 1 according to FIGS. 9 and 10 differs from the one according to FIG. 11 in that the winding of the elements 16, 16a in both fixing sections 32, 34 has approximately the same pitch in the first case, while it is different in the second case. In the embodiment according to FIG. 11, the winding of the elements 16a in the second fixing section 34 has a greater pitch than the winding of the elements 16a in the first fixing section 32. The fixing part 14 in the second fixing section 34 is easier to compress in this case than the one in the first fixing section 32.

The embodiment of the fixing part 14 according to FIGS. 12a through 12f is likewise a spring for subsequent clipping and is provided with a slot 20.

It is characteristic for this fixing part 14 to be provided with fasteners 36a, 36b for crimp connections 38. Such crimp connections 38 can be provided, for example, between the electric heating means 13, which run directly past the connecting piece 2, and connecting or feeding wires 13a, or underneath different line sections of the heating means 13, as shown in the representations of FIGS. 12e and 12f.

Three fasteners 36a, 36b for such crimp connections 38 are provided over the outer circumference of the wall 24 in this embodiment of the fixing part. Two fasteners 36a are each located on a respective small supporting arm 40 at both sides of the slot 20, and a fastener 36b is located diametrically opposite to the slot 20. The fasteners 36a, 36b, which are provided with openings 37a, 37b in which the crimped lines 13, 13a can be clipped, allow axial and radial positioning of the crimp connections 38 in a suitable manner.

Figure 12A:
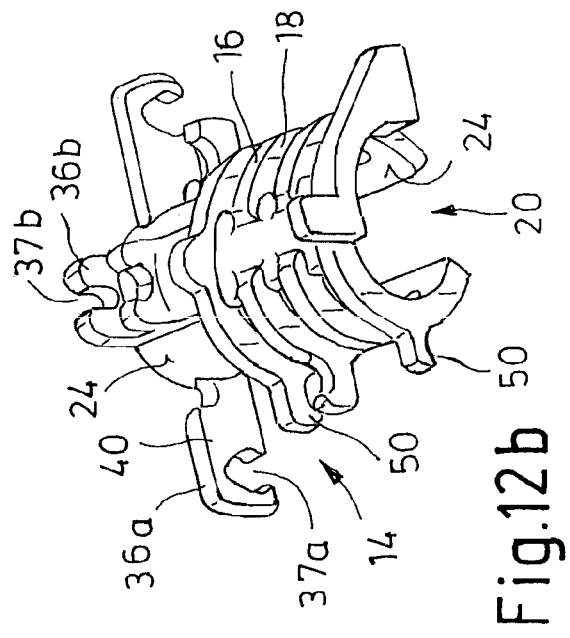
FIGS. 12a through 12d show four different views of a fixing part of a tenth embodiment of a line connector according to the invention.
Figure 12B:
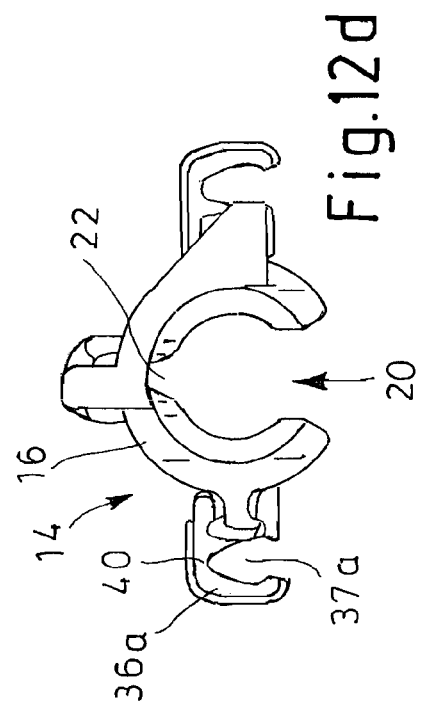
Figure 12C:
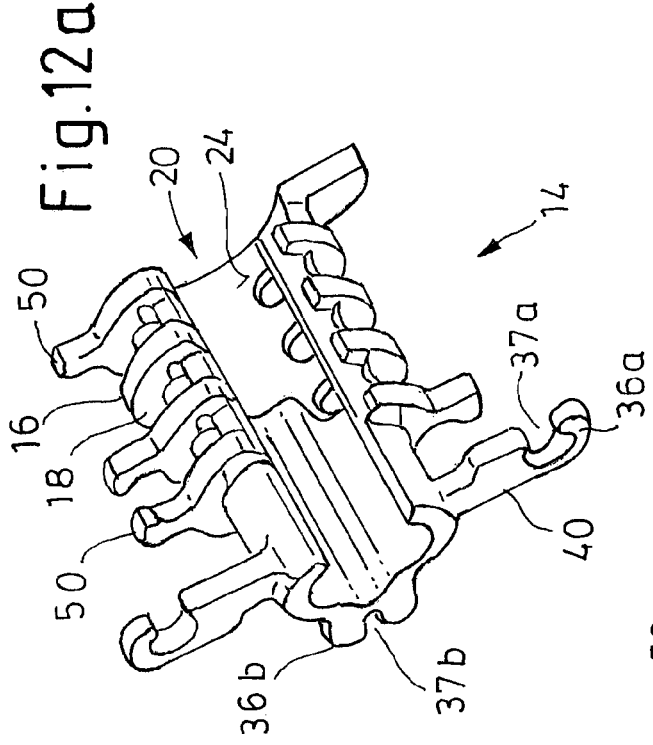
Figure 12D:
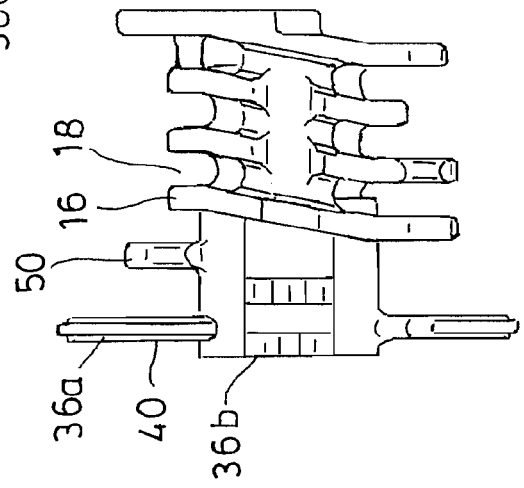
Figure 12E:
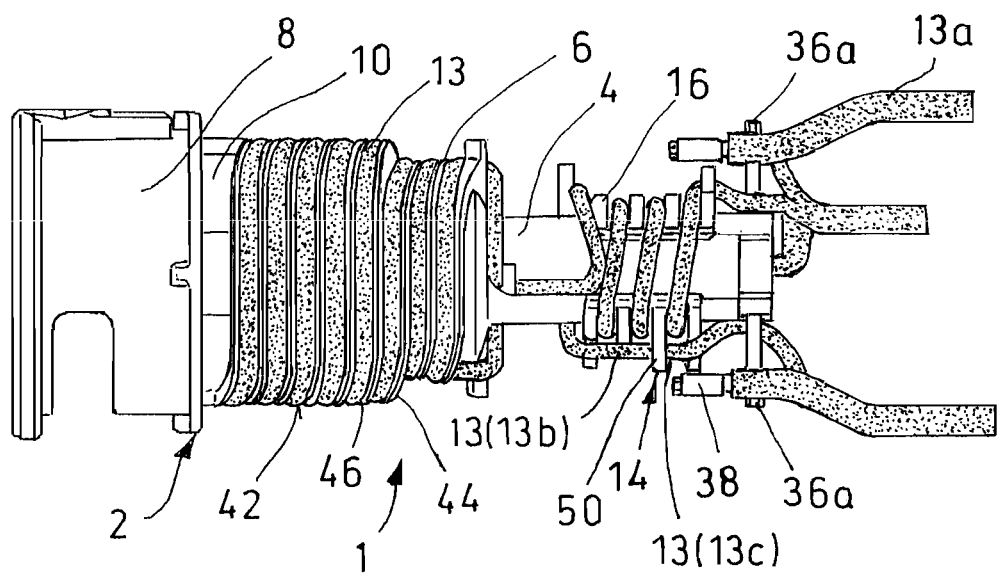
FIGS. 12e and 12f show two views of the tenth embodiment of the line connector according to the invention.
Figure 12F:
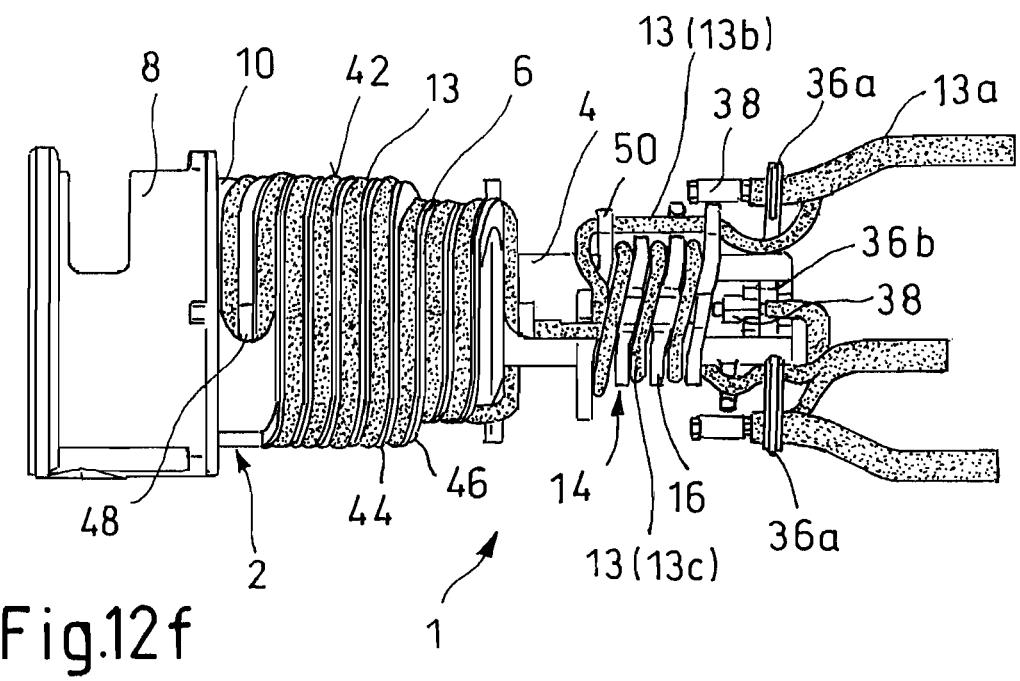

The representations of FIGS. 12e and 12f in this embodiment of the line connector 1 according to the invention also show that the fixing part 14 is exclusively arranged in the area of a connecting section 4 for the media line 3. Even though the heating means 13 are provided in an arrangement that encloses the flow channel 12 in the area of the transition sections 6, 10, they are not fixed by means of the fixing part 14, but as a winding 42 shaped as a double helix, wherein elements 44, 46, 48 for guiding and/or fixing the heating means 13, such as ribs 44 and recesses 46, are arranged in the transition sections 6, 10. Lugs 48 for redirecting the heating means 13—as shown in particular in FIG. 12f—are provided for this purpose.

The representations of FIGS. 12e and 12f finally show that the heating means 13, such as heating wires and cords, can be advantageously guided to the entire connecting piece 2, as well as also in particular to the fixing part 14, within at least two planes, preferably within three planes, at a respectively different distance from the flow channel 12. Distances of a minimum of, for example, 0.5 mm, which prevent a destruction of the material of the line connector 1 and/or the line 3 as a result of the heat development of the heating means 13, can be maintained between the planes. The arrangement of the heating means 13 within different planes also allows the advantageous installation of line lengths, which are necessary as assembly lengths for a crimping procedure and which preferably amount to 20 mm to 25 mm, in a suitable, especially space-saving manner on the connecting piece 2.

It can thus be seen in the drawings that a first plane, which is farthest from the flow channel 12 and in which the crimp connections 38 as well as the connecting or feeding wires 13a are located, is provided on the fixing part 14 in this embodiment. The distance of this plane from the flow channel 12 is determined by the length of the small support arms 40 with the fasteners 36a. A second plane, in which the heating means (identified at this location by reference numeral 13b) is guided in essentially an axial direction over and past the fixing part 14 into the winding 42 of the transition sections 6, 10 is provided herein underneath the first plane. Special guiding or fixing elements configured as attachment pieces are likewise provided for this purpose on the fixing part 14. The heating means (identified at this location by reference numeral 13c) is wound around the circumference in the manner of a helical screw and proceeds into the recesses 46 between the ribs 16 within a third plane located underneath the second plane, which is closest to the flow channel 12.

In the embodiment according to FIGS. 13a through 13f, the fixing part is likewise a slotted spring for subsequent clipping on the connecting piece 2 in the area of the connecting section 4 and has fasteners 36a, 36b for crimp connections 38. A fastener 36a, 36b is formed therein by several mutually spaced small support arms 40, which run parallel to each other, whose receiving openings 37a, 37b are deeper than those in the previously described embodiment. Two line pieces of the heating means 13, which are parallel to each other and to the flow channel, can be simultaneously accommodated in this way in a fastener 36a, 36b beside the crimp connection 38. In this way one of the three planes of the line guides is omitted, as were described with reference to the previous exemplary embodiment.

The small support arms 40 simultaneously form therein the ribs 16, which serve as guiding and fixing elements for one section of the heating means (identified again at this location by reference numeral 13c), in which the heating means 13c are wrapped around the circumference of the fixing part 14. The recesses 18 of the fixing means 14 between the ribs 16 are formed therein by the spaces between the small support arms 40. The two fasteners 36a, which are located at both sides of the slot 20, have openings 37a, which point in different tangential directions, in contrast to the embodiment shown in FIG. 12a through 12f. A small arm 40 located on the front side of FIG. 13b does not have an opening 37a. The crimp connections 38 can thus be advantageously positioned with a stop on the assembly table.

Figure 13E:
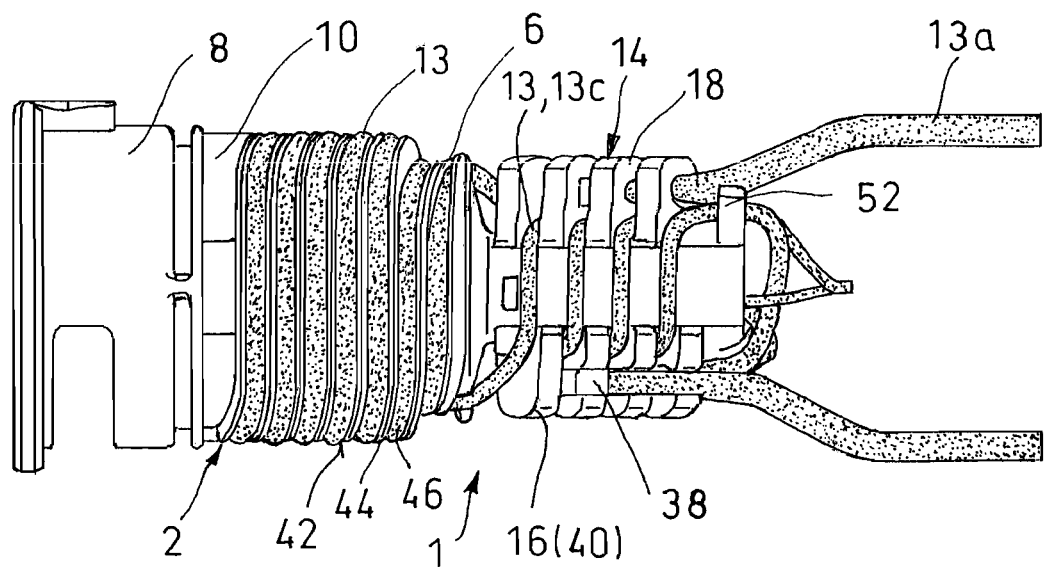
FIGS. 13e and 13f show two views of the eleventh embodiment of the overall line connector according to the invention.
Figure 13F:
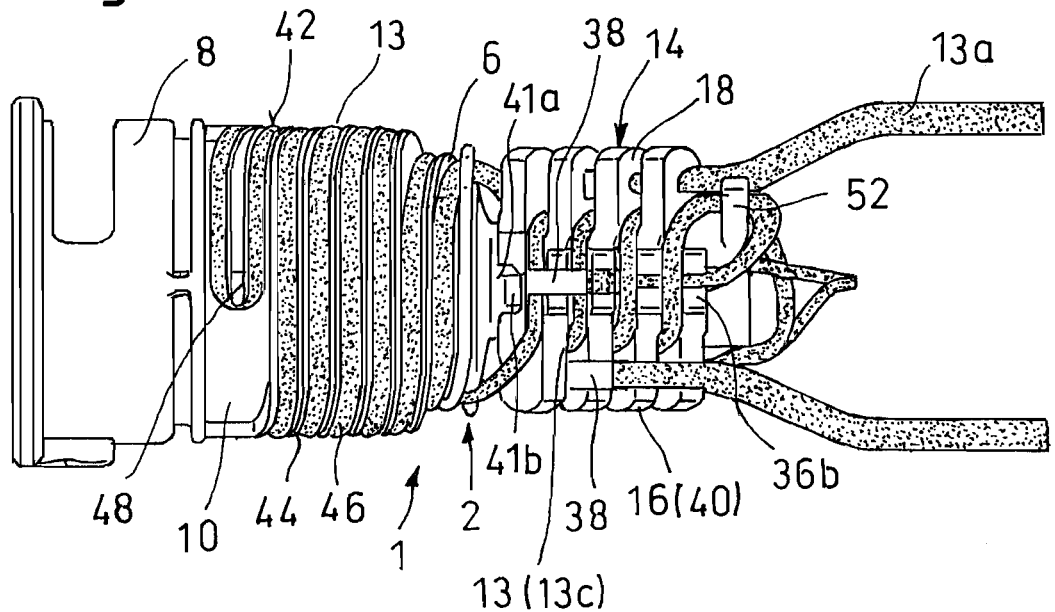

Recesses 41a of the fixing part 14, which are open at one end, serve instead for the axial and radial positioning of the entire fixing part 14 on the connecting piece 2 and can interact for this purpose in the assembled condition—as shown in FIG. 13f—with projections 41b of the connecting piece 2, which have a correspondingly adapted shape.

In this embodiment, the fixing part 14 is provided with attachment pieces 52 on both sides of the slot, which are similar in appearance and are arranged like the crimp connection fasteners 36a of the previous embodiment. The attachment pieces 52 are shorter, however, than the small support arms 40 and serve only for redirecting the heating means, as can be seen in FIGS. 13e and 13f.

The embodiment of FIGS. 14a through 14c essentially coincides in its design with the embodiment of FIGS. 13a through 13f. An inwardly projecting attachment piece 54 is formed herein however as a specific feature at the end of the inner side of the wall 24 of the fixing part 14, which serves for centering the media line 3 by taking into account the smaller diameter of the media line in comparison with that of the connecting section 4. The fixing part 14 can thus be advantageously positioned in such a way that it partially covers the connecting section 4 and the media line 3. This attachment piece 54—similarly as the recesses 41a described above—can thus be effective for the axial positioning on the connecting piece 2 by forming an end stop during assembly. It can also have a securing effect against twisting with respect to the connecting piece 2.

The embodiment of FIGS. 15a through 15c also essentially coincides in its design to the embodiment of FIGS. 13a through 13f and FIGS. 14a through 14c. The difference consists in that the openings 37a of the two fasteners 36a, which are located at both sides of the slot 20, are not directed in a tangential direction, but in a radially opposite outwardly directed direction.

The heating means 13 of a line connector 1 according to the invention can run or be wound predominantly around the circumference or also predominantly axially with regard to the flow channel 12. While they are predominantly circumferentially wound in the previously described embodiments, they are predominantly axially wound—at least in the area of the fixing part 14—in embodiments that will be described in the following.

Figure 16B:
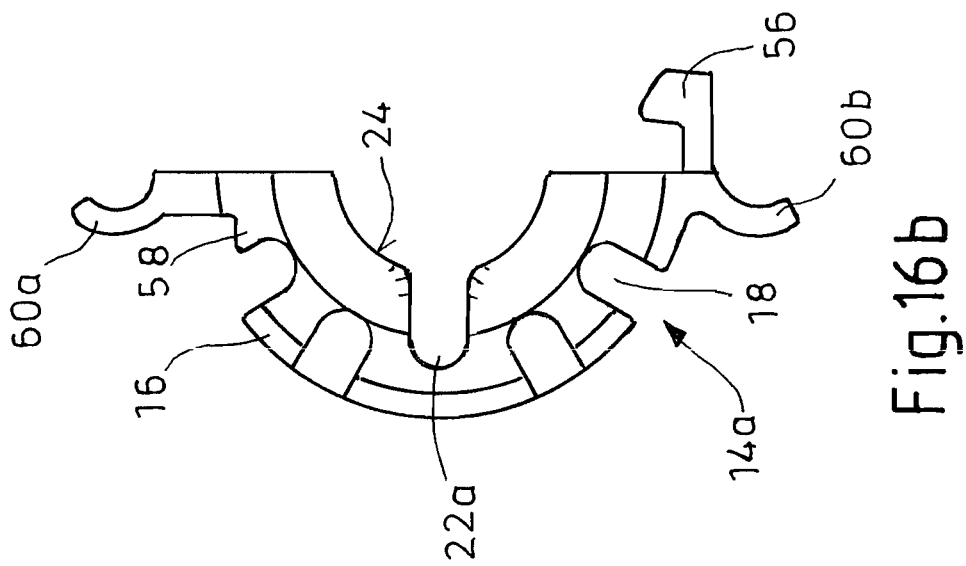
Figure 16A:
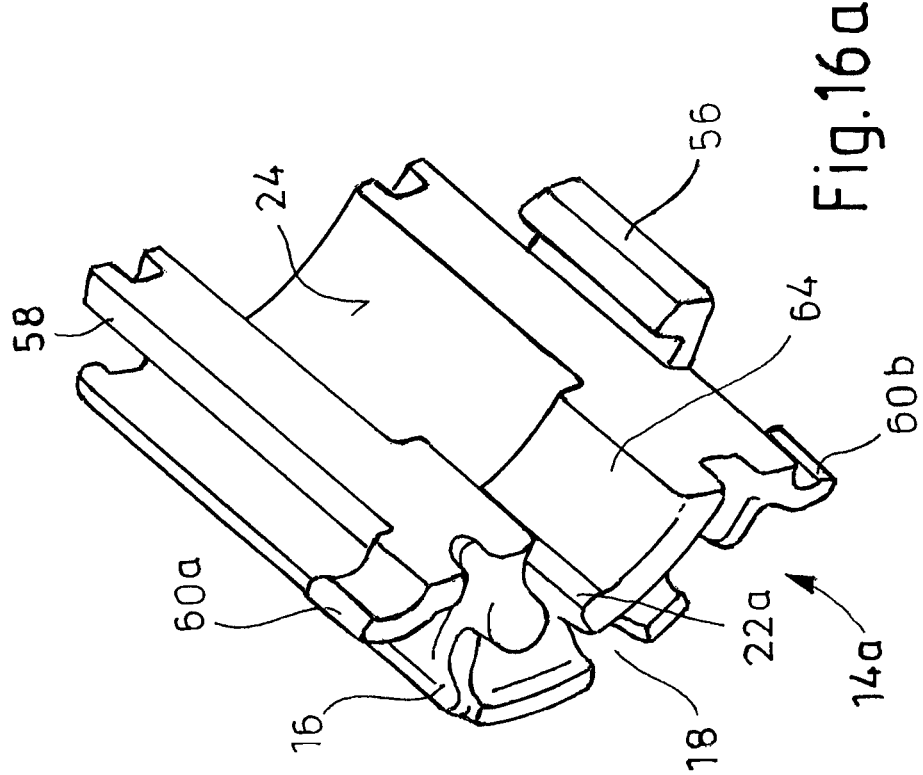
Figure 16E:
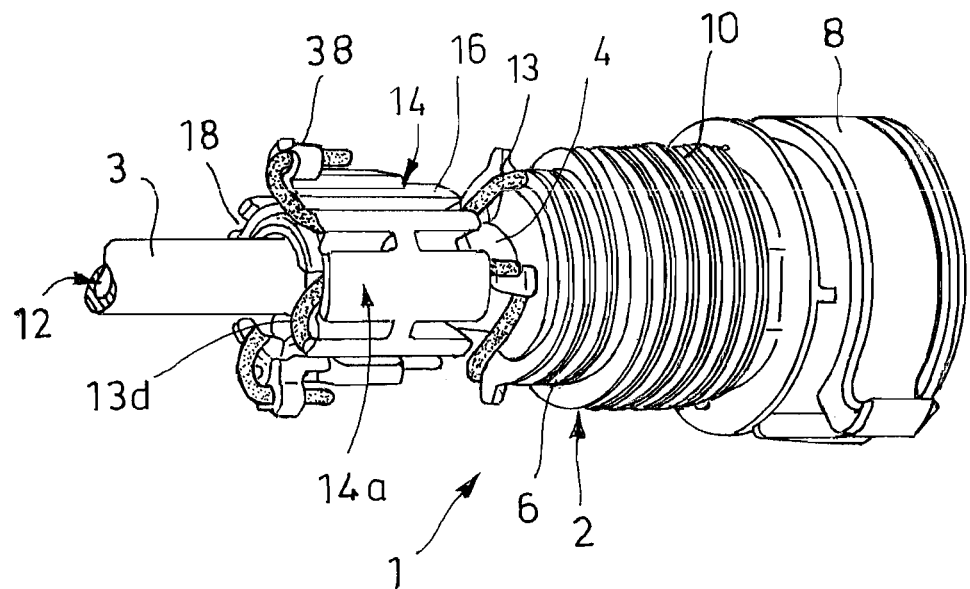
FIGS. 16e and 16f show two different views of the fourteenth embodiment of the line connector according to the invention assembled with a connecting piece and heating wires.
Figure 16F:
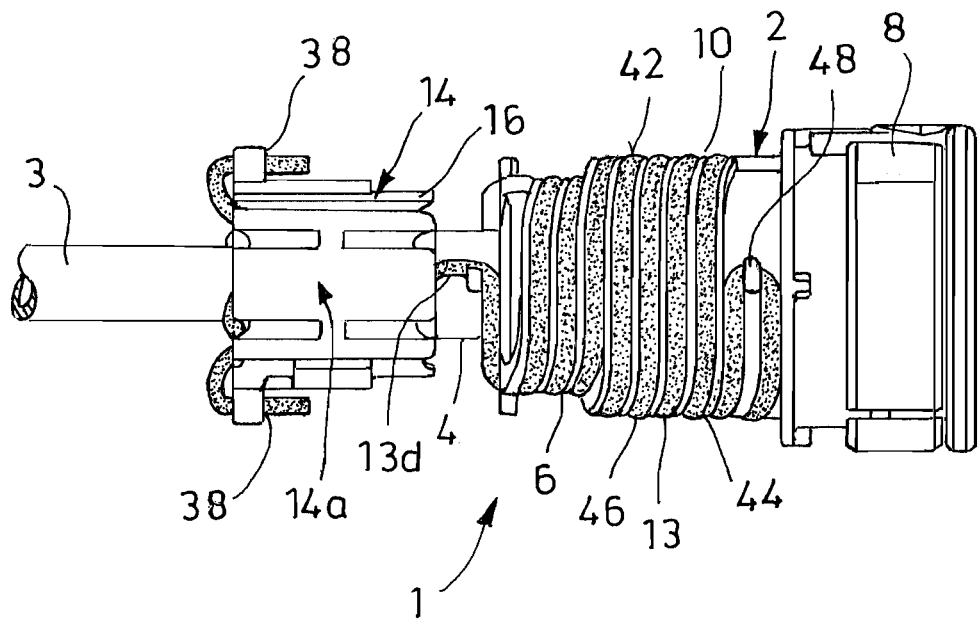

Therefore, FIGS. 16c and 16d show a fixing part 14 which is comprised of two identically designed clamp halves 14a or half shells, of which one is depicted as a single part in FIGS. 16a and 16b, respectively. The assembled condition in the line connector 1 according to the invention is shown in FIGS. 16e and 16f. Each clamp half 14a has ribs 16 and recesses 18, which run respectively axially parallel to the flow channel 12 in the assembled state. The clamp halves 14a have furthermore a longitudinal notch 22a at the inner circumference of the wall 24, which makes it possible to guide a cable underneath the wall. A piece of the electric heating means 13, which is guided in this way, is identified with reference numeral 13d in FIGS. 16e and 16f. A connection of the two clamp halves 14a to each other takes place by means of locking tabs 56, which engage behind a matching locking edge 58 at the respective other clamp half 14a. At the end of the fixing part 14 there are arranged two fasteners 60, which project from the outer circumference of the wall 24 and are arranged diametrically with respect to each other, and which can accommodate crimp connections 38 in their radially outwardly directed openings 62 as shown in FIGS. 16e and 16f. The fasteners 60 are formed by corresponding half elements 60a, 60b at each fixing part half 14a during assembly. This embodiment of the fixing part can also be positioned in such a way that it partially covers the connecting section 4 and the media line 3, which is shown in FIGS. 16e and 16f. An internal area 64 of the wall 24, which has a reduced diameter, is provided herein at one end—as shown in particular in FIG. 16a—in order to center the media line 3.

The embodiment of FIGS. 17a through 17c essentially coincides in its design with the embodiment of FIGS. 16a through 16f. In turn, the figures in the drawing show clamp halves 14a which have a notch 22a for guiding a cable underneath the wall 24 and an area 64 of the wall 24, which has a reduced diameter, for centering the media line 3. However, the fixation of the clamp halves 14a to each other does not take place by means of locking tabs 56 in this embodiment, but by means of a notch 66 having an approximately conical cross section and a spring 68 with matching shape, which are mutually engaged with each other during assembly.

The embodiment of FIGS. 18a through 18c also essentially coincides with the basic design of the embodiment of FIGS. 16a through 16f. However, the two clamp halves 14a are advantageously undetachably connected herein via a film hinge 70. The fixation on the other side takes place in turn by means of a locking tab 56, which engages behind a locking edge 58 in the assembled state. This embodiment does not have any fasteners 60 for the clamp connection 38 and does not have an internal longitudinal notch 22a for guiding a cable.

The embodiment of the fixing part 14 according to FIGS. 19a through 19c represents a simplified embodiment with respect to the embodiment shown in FIGS. 16a through 16f, insofar as no internal longitudinal notch 22a is provided herein for guiding a cable underneath the wall 24. All of the other features are identical.

The embodiment of the fixing part 14 according to FIGS. 20a through 20c shows a clamp provided with a slot 20 and is configured with a cross section that essentially follows a winding predominantly around the circumference, as was described in detail above with reference to the fixing part 14, but has ribs 16 and recesses 18 which run essentially axially parallel to the flow channel 12 in the assembled state. The fixing part 14 serves for subsequent clipping onto the connecting piece 2 in the area of the connecting section 4 and the media line 3 and has two fasteners 60 for the crimp connections 38 as well as an area 64 of the wall 24 which has a reduced diameter for centering the media line 3.

As can be already seen in the previous embodiments, the invention is not limited to the described exemplary embodiments shown in the drawings, but comprises also all of the embodiments that have the same effect for the purposes of the invention. The connecting piece 2 and the fixing part 14 can thus be conceived in such a way, for example, that they are undetachably connected or can be undetachably connected to each other, for example, by gluing or welding. The fixing part 14 could also have stiff, outwardly projecting attachment pieces 16 as elements 16, 18 for guiding and fixing the heating means 13.

As heating means 13, flat heating elements could also be provided, for example, in the form of a glued heating foil, instead of a heating wire 13 over the outer contour of the fixing element 14. The surface or outer contour of the fixing part 14 could be configured accordingly.

In order to achieve a good heat conductivity with a connecting piece 2 and/or fixing part 14 made of plastic, the plastic material can be provided with specific fillers in order to increase the heat conductivity. Particles of aluminum, $Al_2O_3$, glass and/or carbon fibers are suitable as such fillers.

The heating means 13 can be configured with a capacity of 3 to 20 Watts and the heating wire can be configured with a length of, for example, up to 200 mm. A capacity quotient within the range of 1 to 15 Watt/cm$^3$ is practical for a connecting piece 2 with an interior volume of the flow channel 11 within the range of 0.1 to 1.0 cm$^3$. The heating wire can be configured with negative temperature coefficients (NTC) or with positive temperature coefficients (PTC). A supply voltage on the order of magnitude of 10 to a maximum of 32 Volts is practical. It is also possible to configure the material of the fixing part 14 itself as an electrically conducting heating means 13, for example, as a busbar.

The connecting sections 4, 8 can be configured in the most different ways, as was already mentioned. As shown in FIGS. 1, 2, 9, 11, 12e, 12f, 13e, 13f, 16e and 16f using the example of the connecting section identified by reference numeral 8, the latter can be configured, for example—as mentioned—as connecting sleeve for the purpose of accommodating a plug shaft. Any desired means, in particular, for releasably locking the plug connection parts can be provided in the case of a plug connection.

The person skilled in the art can also provide additional supplementary practical procedures without abandoning the spirit and scope of the invention. If at least one of the connecting sections 4, 8 is configured as hollow cylindrical receiver for directly inserting the end of the media line 3 and the media line 3 can be attached therein by means of welding, it may be problematic that it may no longer be possible, for example, to optically differentiate the components that were welded by laser from those that were not after the welding procedure. This is also normally the case with a density and pressure test. The welded area can be changed herein by means of the laser beam in such a way, for example, with regard to color, brightness, and/or surface structure, by means of a suitable selection of a lacquer coat, material color, batch, etc. that a clear evidence with regard to the presence or absence of welding is provided.

In connection with the line connector 1 according to the invention depicted in FIG. 11, it was already explained that the winding of the elements 16, 16a in the two fixing sections 32, 34 can have a different pitch. This winding can also change, if necessary, in a gradual or tangential manner within one section.

The heating means 13 must not necessarily be an electric means 13, but it is also possible to provide other heating means 13, for example, a pipe or a tube line. A connecting section 6, 8 and/or a transition section 10 can subsequently be additionally encapsulated in particular for purposes of isolation. The fixing part 14 can also be used—as mentioned—for centering and fixing on the media line 3 and/or on a socket.

The invention is furthermore also not limited to the feature combination defined in the independent claims, but can also be defined by means of any other combination of specific features among all of the disclosed individual features. This means that basically every individual feature of the independent claims can be practically omitted or replaced by at least one individual feature disclosed at another location of the disclosure. The claims are insofar to be understood as merely a first formulation attempt of an invention.

The invention claimed is:

1. A line connector for media lines, comprising of a connecting piece having a flow channel and at least one connecting section for connection to a media line or to a unit, the connecting piece also having at least one transition section adjacent to the connecting section, the line connector also including a fixing port and heating means provided in an arrangement that at least partially encircles the flow channel, wherein the fixing part includes elements arranged on the connecting piece for guiding and/or fixing the heating means, wherein the connecting section is made at least partially of a material that is transparent to laser beams in such a way that the media line is attached by laser beam welding.

2. A line connector for media lines, comprising of a connecting piece having a flow channel and at least one connecting section for connection to a media line or to a unit, the connecting piece also having at least one transition section adjacent to the connecting section, the line connector also including a fixing port and heating means provided in an arrangement that at least partially encircles the flow channel, wherein the fixing part includes elements arranged on the connecting piece for guiding and/or fixing the heating means, wherein the fixing part is made from a spring elastic material that is at least one of expandable in a radial direction and compressible in an axial direction.

3. A line connector for media lines, comprising of a connecting piece having a flow channel and at least one connecting section for connection to a media line or to a unit, the connecting piece also having at least one transition section adjacent to the connecting section, the line connector also including a fixing port and heating means provided in an arrangement that at least partially encircles the flow channel, wherein the fixing part includes elements arranged on the connecting piece for guiding and/or fixing the heating means, wherein the heating means are provided on the fixing part in at least two zones having respectively different radial distances to the flow channel.

4. The line connector according to claims 1, 2 or 3, wherein the heating means has at least one heating wire provided in an arrangement with an approximately even surface distribution, and wherein the heating means runs circumferentially with respect to the flow channel.

5. The line connector according to claims 1, 2 or 3, wherein the fixing part is positioned in an area of the connecting section and the media line.

6. The line connector according to claims 1, 2 or 3, wherein the fixing part includes a centering mechanism for the media line in the form of one of an attachment piece and an area having a reduced diameter.

7. The line connector according to claims 1, 2 or 3, wherein the fixing part has a longitudinal notch at an inner circumference of a wall and configured to guide a section of the heating means.

8. The line connector according to claims 1, 2 or 3, wherein the fixing part has outwardly projecting ribs and groove-shaped recesses into which the heating means is received and fixed.

9. The line connector according to claims 1, 2 or 3, wherein the heating means is wound on the outside and encloses the connecting piece and the fixing part.

10. The line connector according to claims 1, 2 or 3, where at least one of the connecting sections is configured as a hollow cylindrical receiver for direct insertion of an end of the media line, and wherein the media line is attached in a firmly bonded manner, by one of gluing and welding.

11. The line connector according to claims 1, 2 or 3, wherein the connecting section includes a material which changes in particular at least one of its optical properties, brightness and surface structure as a result of a laser radiation.

12. The line connector according to claims 1, 2 or 3, wherein the fixing part has a longitudinal slot.

13. The line connector according to claims 1, 2 or 3, wherein the fixing part is clipped onto the connecting piece.

14. The line connector according to claims 1, 2 or 3, wherein the fixing part completely encircles the connecting piece in the manner of a collar.

15. The line connector according to claims 1, 2 or 3, wherein the fixing part is configured as a spirally corrugated pipe.

16. The line connector according to claims 1, 2 or 3, wherein the fixing part is formed by two mutually connectable clamp halves.

17. The line connector according to claims 1, 2 or 3, further comprising the fixing part having at least one first fixing section in which the heating means is received and has a diameter adapted to the transition section and has a second fixing section in which the heating means has a diameter that is adapted to the connecting section.

18. The line connector of claim 17, wherein a pitch of winding elements in the first fixing section differs from a pitch of winding elements in the second fixing section such that the pitch in the first fixing section is smaller than the pitch in the second fixing section.

19. The line connector according to claims 1, 2 or 3, wherein the fixing part is a plastic molding, for example, an injection molded part produced in a two component process.

20. The line connector according to claims 1, 2 or 3, wherein the fixing element has fasteners for receiving crimp connections between the electric heating means and between the electric heating means and lead-in wires.

21. The line connector according to claims 2 or 3, wherein the connecting section is made at least partially of a material that is transparent to laser beams in such a way that the media line is attached by laser beam welding.

22. The line connector according to claims 1 or 3, wherein the fixing part is made from a spring elastic material that is at least one of expandable in a radial direction and compressible in an axial direction.

23. The line connector according to claims 1 or 2, wherein the heating means are provided on the fixing part in at least two zones having respectively different radial distances to the flow channel.

* * * * *